(12) United States Patent
Imai

(10) Patent No.: US 7,570,836 B2
(45) Date of Patent: *Aug. 4, 2009

(54) BACKLIT IMAGE JUDGMENT

(75) Inventor: Toshie Imai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 652 days.

This patent is subject to a terminal disclaimer.

(21) Appl. No.: 10/909,069

(22) Filed: Jul. 29, 2004

(65) Prior Publication Data

US 2005/0084174 A1   Apr. 21, 2005

(30) Foreign Application Priority Data

Jul. 30, 2003   (JP)   ............... 2003-203431

(51) Int. Cl.
    *G06K 9/40* (2006.01)
(52) U.S. Cl. .................. 382/274; 382/282; 382/168
(58) Field of Classification Search ................ 382/162, 382/169–172, 274
    See application file for complete search history.

(56) References Cited

U.S. PATENT DOCUMENTS

| 7,058,221 | B1 * | 6/2006 | Shikata | .................... | 382/169 |
| 7,200,265 | B2 * | 4/2007 | Imai | ............... | 382/168 |
| 2002/0085248 | A1 * | 7/2002 | Xu et al. | .................. | 358/509 |
| 2005/0084174 | A1 * | 4/2005 | Imai | ............... | 382/274 |

FOREIGN PATENT DOCUMENTS

| JP | 10-079885 | 3/1998 |
| JP | 11-120325 | 4/1999 |
| JP | 2000-134467 | 5/2000 |
| JP | 2001-169114 | 6/2001 |
| JP | 2002-010073 | 1/2002 |
| JP | 2002-185771 | 6/2002 |
| JP | 2003-248822 | 9/2003 |
| JP | 2003-337944 | 11/2003 |

OTHER PUBLICATIONS

Abstract of Japanese Patent Publication No. 2002-185771, Pub. Date: Jun. 28, 2002, Patent Abstracts of Japan.

(Continued)

*Primary Examiner*—Matthew C. Bella
*Assistant Examiner*—Sath V. Perungavoor
(74) *Attorney, Agent, or Firm*—Martine Penilla & Gencarella, LLP

(57) ABSTRACT

A CPU 200 analyzes inner region pixels IP and outer region pixels OP independently; compares an inner luminance distribution characteristic i.e. a luminance distribution characteristic regarding the inner region pixels IP with a reference inner luminance distribution characteristic regarding image data of a backlit image that is previously stored in a HDD 202; and thereby calculates an inner similarity Si. Similarity, the CPU 200 compares an outer luminance distribution characteristic i.e. a luminance distribution characteristic regarding the outer region pixels OP with a reference outer luminance distribution characteristic, and thereby calculates an outer similarity So. The CPU 200 then calculates a total similarity St by multiplying the calculated inner similarity Si by the outer similarity So. If the total similarity St is greater than a criterion similarity Stref, the CPU 200 judges the shot image to be a backlit image.

3 Claims, 10 Drawing Sheets

OTHER PUBLICATIONS

Abstract of Japanese Patent Publication No. 10-079885, Pub. Date: Mar. 24, 1998, Patent Abstracts of Japan.

Abstract of Japanese Patent Publication No. 11-120325, Pub. Date: Apr. 30, 1999, Patent Abstracts of Japan.

Abstract of Japanese Patent Publication No. 2000-134467 Pub. Date: May 12, 2000, Patent Abstracts of Japan.

Abstract of Japanese Patent Publication No. 2001-169114 Pub. Date: Jun. 22, 2001, Patent Abstracts of Japan.

Abstract of Japanese Patent Publication No. 2002-010073 Pub. Date: Jan. 11, 2002, Patent Abstracts of Japan.

Abstract of Japanese Patent Publication No. 2003-248822, Pub. Date: Sep. 5, 2003, Patent Abstracts of Japan.

Abstract of Japanese Patent Publication No. 2003-337944 Pub. Date: Nov. 28, 2003, Patent Abstracts of Japan.

* cited by examiner

BACKLIT IMAGE JUDGMENT

BACKGROUND OF THE INVENTION

1. Field of Technology

The present invention relates to a method of making a judgment on whether a shot image is a backlit image and an image processing device having a module for the judgment.

2. Description of the Related Art

Shooting an image of a foreground object such as a person under a backlight condition generally results in an image having a background of higher luminance and the object or the person of lower luminance. In such a case, electronic flash can be forced out to increase the luminance of the object so that details of the person such as expressions can be shot with clarity. However, not every photographer always uses electronic flash under such a backlight condition.

In case where an image of a object is shot by a digital still camera (DSC), the generated image data can be subjected to image processing with relative ease. A variety of techniques has been proposed and is in practical use for such image processing. Such image processing techniques include execution of various image processing such as contrast correction, brightness correction, and saturation correction (totally referred to as an automatic image quality adjustment) on the image data, based on a given correction condition selected by a user i.e. contrast correction, brightness correction, or saturation correction, or alternatively based on the result of analysis on the image data.

In the conventional image processing techniques, however, the analysis of image data characteristic sometimes results in an inappropriate judgment on whether the shot image is an image of a person under a backlight condition. In such a case, the user may be required to judge the imaging condition of the image data. In other words, the automatic image processing by a personal computer sometimes results in an unsuccessful judgment on whether the image data is image data of a backlit image of a person. In such a case, the image data of a backlit image of a person may possibly be subjected to inappropriate automatic image processing.

SUMMARY OF THE INVENTION

The purpose of the present invention is to solve the afore-mentioned problem and to make an appropriate judgment on whether a shot image is an image of a foreground object e.g. a person under a backlight condition by analyzing image data of the shot image.

In order to solve the afore-mentioned problem, a first aspect of the present invention provides a method of making a judgment on whether a shot image is a backlit image, based on image data that is comprised of plural pixels. The method according to the first aspect of the present invention is characterized in comprising: acquiring the image data; among the plural pixels constituting the image data, analyzing inner region pixels corresponding to the central region of the shot image and thereby acquiring an inner luminance distribution characteristic; calculating an inner similarity that indicates a degree of similarity between the central region of a backlit image and the central region of the shot image by using the acquired inner luminance distribution characteristic; among the plural pixels constituting the image data, analyzing outer region pixels corresponding to the non-central region of the shot image and thereby acquiring an outer luminance distribution characteristic; calculating an outer similarity that indicates a degree of similarity between the non-central region of the backlit image and the non-central region of the shot image by using the acquired outer luminance distribution characteristic; and making a judgment on whether the shot image is a backlit image by using the calculated inner similarity and outer similarity.

In the method according to the first aspect of the present invention, whether the shot image is a backlit image is judged by calculating an inner similarity indicating a degree of similarity between the central region of a backlit image and the central region of the shot image, calculating an outer similarity indicating a degree of similarity between the non-central region of the backlit image and the non-central region of the shot image, and then by using the calculated inner similarity and outer similarity. Analyzing the image data thus allows for an appropriate judgment on whether the shot image is an image of a foreground object e.g. a person under a backlight condition.

In the method according to the first aspect of the present invention, the inner similarity may be calculated by comparing the acquired inner luminance distribution characteristic with a criterion inner luminance distribution characteristic i.e. a backlit image judgment model regarding the inner region pixels; and the outer similarity may be calculated by comparing the acquired outer luminance distribution characteristic with a criterion outer luminance distribution characteristic i.e. a backlit image judgment model regarding the outer region pixels. This allows the backlit image judgment to be made in a way to conform closely to the impression of the entire image and at the same time, also improves the time required for the backlit image judgment.

In the method according to the first aspect of the present invention, the making a judgment on whether the shot image is a backlit image is executed by judging the shot image to be backlit image when a product of the inner similarity and the outer similarity is equal to or less than a predetermined value. This allows for the backlit image judgment on the basis of the judgment on the similarity of the entire image in addition to the individual judgments on the inner similarity and the inner similarity of the image, and can result in a more appropriate backlit image judgment.

A second aspect of the present invention provides a method of making a judgment on whether a shot image is a backlit image, based on image data that is comprised of plural pixels. The method according to the second aspect of the present invention is characterized in comprising: acquiring the image data; among the plural pixels constituting the image data, analyzing object region pixels corresponding to the object region of the shot image and thereby acquiring a object region luminance distribution characteristic; calculating a object similarity that indicates a degree of similarity between the object region of a backlit image and the object region of the shot image by using the acquired object region luminance distribution characteristic; among the plural pixels constituting the image data, analyzing background region pixels corresponding to the background region or the non-object region of the shot image and thereby acquiring a background region luminance distribution characteristic; calculating a background similarity that indicates a degree of similarity between the background region of the backlit image and the background region of the shot image by using the acquired background region luminance distribution characteristic; and making a judgment on whether the shot image is a backlit image by using the calculated object similarity and background similarity.

In the method according to the second aspect of the present invention, whether the shot image is a backlit image is judged by calculating a object similarity indicating a degree of similarity between the object region of a backlit image and the object region of the shot image, calculating a background similarity indicating a degree of similarity between the background region of the backlit image and the background region of the shot image, and then by using the calculated object similarity and background similarity. Analyzing the image data thus allows for an appropriate judgment on whether the shot image is an image of a foreground object e.g. a person under a backlight condition.

In the method according to the second aspect of the present invention, the object similarity may be calculated by comparing the acquired object luminance distribution characteristic with a criterion object luminance distribution characteristic i.e. a backlit image judgment model regarding the object region pixels; and the background similarity may be calculated by comparing the acquired background luminance distribution characteristic with a criterion background luminance distribution characteristic i.e. a backlit image judgment model regarding the background region pixels. This allows the backlit image judgment to be made in a way to conform closely to the impression of the entire image, and at the same time, also improves the time required for the backlit image judgment.

In the method according to the second aspect of the present invention, making a judgment on whether the shot image is a backlit image is executed by judging the shot image to be a backlit image when a product of the object similarity and the background similarity is equal to or less than a predetermined value. This allows the backlit image judgment to be made on the basis of the judgment on the similarity of the entire image in addition to the individual judgments on the inner similarity and the inner similarity of the image, and can result in a more appropriate backlit image judgment.

A third aspect of the present invention provides a method of making a judgment on whether a shot image is a backlit image, based on image data that is comprised of plural pixels. The method according to the third aspect of the present invention is characterized in comprising: acquiring the image data; among the plural pixels constituting the acquired image data, analyzing inner region pixels corresponding to the central region of the shot image and thereby acquiring an inner image quality characteristic indicating an image quality characteristic; among the plural pixels constituting the acquired image data, analyzing outer region pixels corresponding to the non-central region of the shot image and thereby acquiring an outer image quality characteristic indicating an image quality characteristic; calculating an inner similarity that indicates a degree of similarity between features in the central region of a backlit image and features in the central region of the shot image by using the acquired inner image quality characteristic; calculating an outer similarity that indicates a degree of similarity between features in the non-central region of the backlit image and features in the non-central region of the shot image by using the acquired outer image quality characteristic; and making a judgment on whether the shot image is a backlit image by using the calculated inner similarity and outer similarity.

In the method according to the third aspect of the present invention, whether the shot image is a backlit image is judged by calculating an inner similarity indicating a degree of similarity between features in the central region of a backlit image and features in the central region of the shot image, calculating an outer similarity indicating a degree of similarity between features in the non-central region of the backlit image and features in the non-central region of the shot image, and then by using the calculated inner similarity and outer similarity. Analyzing the image data thus allows for an appropriate judgment on whether the shot image is an image of a foreground object e.g. a person under a backlight condition.

The method according to either one of the first to third aspects of the present invention may further comprise executing a brightness correction suitable for an backlit image when the shot image is judged to be a backlit image.

The method for judgment according to either one of the first to third aspects of the present invention may also be actualized by a program for judgment and a recording medium for storing the same. This allows a backlit image to be corrected to have the equivalent image quality as a normal-lit image (an non-backlit image).

A fourth aspect of the present invention provides an image processing device that makes a judgment on whether a shot image is a backlit image, based on image data that is comprised of plural pixels. The image processing device according to the fourth aspect of the present invention is characterized in comprising: an acquiring module that acquires the image data; an analysis module that partitions the plural pixels constituting the acquired image data into inner region pixels corresponding to the central region of the shot image and outer region pixels corresponding to the non-central region of the shot image, and thereby analyzes the respective groups of pixels; an inner luminance distribution characteristic acquiring module that acquires an inner luminance distribution characteristic i.e. a luminance distribution characteristic regarding the inner region pixels, by using the result of the analysis; an outer luminance distribution characteristic acquiring module that acquires an outer luminance distribution characteristic i.e. a luminance distribution characteristic regarding the outer region pixels, by using the result of the analysis; an inner similarity calculation module that calculates an inner similarity indicating a degree of similarity between the central region of a backlit image and the central region of the shot image, by using the acquired inner luminance distribution characteristic; an outer similarity calculation module that calculates an outer similarity indicating a degree of similarity between the non-central region of the backlit image and the non-central region of the shot image, by using the acquired outer luminance distribution characteristic; and a judgment module that makes a judgment on whether the shot image is a backlit image, by using the calculated inner similarity and inner similarity.

The image processing device according the fourth aspect of the present invention can obtain the similar effects and functions as the method according to the first aspect of the present invention. In addition, the image processing device according to the fourth aspect of the present invention can also be actualized in a variety of aspects in a way similar to the method according to the first aspect of the present invention.

A fifth aspect of the present invention provides an image processing device that makes a judgment on whether a shot image is a backlit image, based on image data that is comprised of plural pixels. The image processing device according to the fifth aspect of the present invention is characterized in comprising: an acquiring module that acquires the image data; an analysis module that partitions the plural pixels constituting the acquired image data into object region pixels corresponding to the object region of the shot image and background region pixels corresponding to the background region or the non-object region of the shot image, and thereby analyzes the respective groups of pixels; a object luminance distribution characteristic acquiring module that acquires a object luminance distribution characteristic i.e. a luminance distribution characteristic regarding the object region pixels, by using the result of analysis; a background luminance distribution characteristic acquiring module that acquires a background luminance distribution characteristic i.e. a luminance distribution characteristic regarding the background region pixels, by using the result of analysis; a object similarity calculation module that calculates a object similarity indicating a degree of similarity between the object region of a backlit image and the object region of the shot image, by using the acquired object luminance distribution characteristic; a background similarity calculation module that calculates a background similarity indicating a degree of similarity between the background region of the backlit image and the background region of the shot image, by using the acquired background luminance distribution characteristic; and a judgment module that makes a judgment on whether the shot image is a backlit image, by using the calculated object similarity and background similarity.

The image processing device according the fifth aspect of the present invention can obtain the similar effects and functions as the method according to the first aspect of the present invention. In addition, the image processing device according to the fourth aspect of the present invention can also be actualized in a variety of aspects in a way similar to the method according to the first aspect of the present invention.

A sixth aspect of the present invention provides an image processing device that makes a judgment on whether a shot image is a backlit image, based on image data that is comprised of plural pixels. The image processing device according to the sixth aspect of the present invention is characterized in comprising: an image data acquiring module that acquires the image data; a pixel region partitioning module that partitions the plural pixels constituting the acquired image data into inner region pixels corresponding to the central region of the shot image and outer region pixels corresponding to the non-central region of the shot image; an inner image quality characteristic acquiring module that analyzes the inner region pixels and thereby acquires an inner image quality characteristic indicating an image quality characteristic; an outer image quality characteristics acquiring module that analyzes the outer region pixels and thereby acquires an outer image quality characteristic indicating an image quality characteristic; an inner similarity calculation module that calculates an inner similarity indicating a degree of similarity between features in the central region of a backlit image and features in the central region of the shot image, by using the acquired inner image quality characteristic; an outer image quality characteristic calculation module calculates an outer similarity indicating a degree of similarity between features in the non-central region of the backlit image and features in the non-central region of the shot image, by using the acquired outer image quality characteristic; and a judgment module that makes a judgment on whether the shot image is a backlit image, by using the calculated inner similarity and outer similarity.

The image processing device according the sixth aspect of the present invention can obtain the similar effects and functions as the method according to the third aspect of the present invention. In addition, the image processing device according to the sixth aspect of the present invention can also be actualized in a variety of aspects in a way similar to the method according to the third aspect of the present invention.

DETAILED DESCRIPTION OF THE PREFERRED EMBODIMENTS

The following describes an image processing device and a method for backlit image judgment according to the present invention, based on examples and with reference to drawings.

Figure 1:
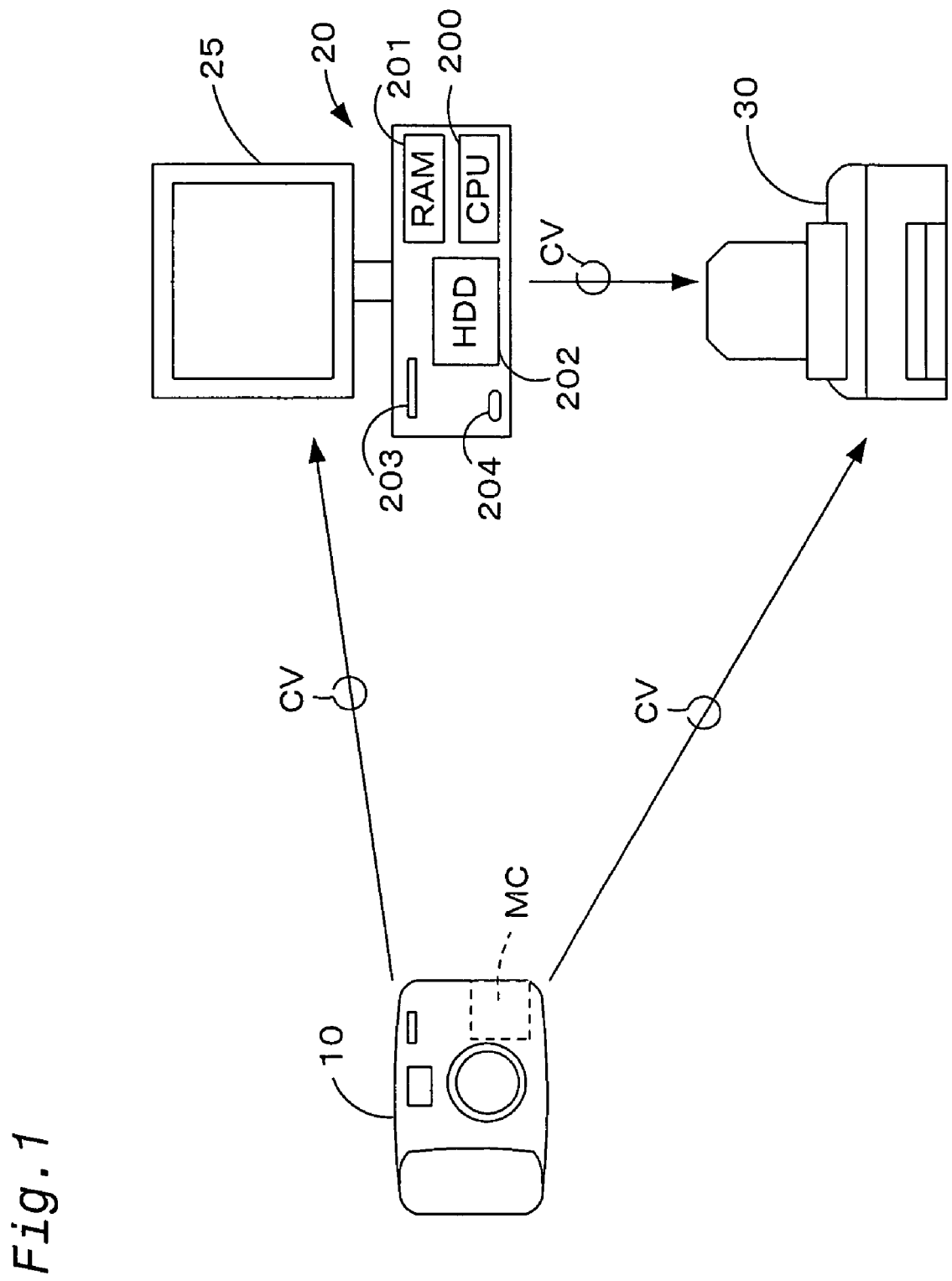
FIG. 1 is a schematic that shows an example of an image processing system including a personal computer as an image processing device of the present embodiment.

A. Arrangement of Image Processing System:

An arrangement of an image processing system, to which an image processing device of the present embodiment can be applied, will now be described with reference to FIG. 1. FIG. 1 is a schematic diagram that shows an example of an image processing system that includes a personal computer as an image processing device of the present embodiment.

The image processing system includes: a digital still camera 10 as an input device that generates image data; a personal computer 20 as an image processing device that makes a judgment on whether the image data generated by the digital still camera 10 is that of a backlit image, executes image processing, and outputs image data for printing; and a color printer 30 as an output device that outputs an image by using the image data for printing. Alternatively, the color printer 30 may have the function of image processing, which is of the personal computer PC. In such a case, the color printer 30 can execute both the functions of image processing and image output in a stand-alone mode. As the output device, other devices such as monitors (e.g. CRT display or LCD display) and projectors may be used instead of the printer 30. In the following description, however, the color printer 30 is used as the output device in connection with the personal computer 20.

The personal computer 20 is a generally used type of computer that includes: a CPU 200 that executes a program for image processing including backlit image judgment processing: a RAM 201 that temporally stores data such as the result of operation by the CPU 200 and the image data; and a hard disc drive (HDD) 202 that stores the program for image processing. The personal computer 20 also includes: a card slot 203 for receiving a memory card MC; and an input/output terminal 204 for receiving a connecting cable from e.g. the digital still camera 10.

The digital still camera 10 is a camera that acquires an image by focusing optical information onto a digital device (e.g. a CCD or a photomultiplier) and includes: a photoelectric transferring circuit including e.g. a CCD for transferring the optical information into electrical information; an image acquiring circuit for controlling the photoelectric transferring circuit and thereby acquiring an image; and an image processing circuit for processing the acquired digital image. The digital still camera 10 saves the acquired image as digital data into a memory card MC as a storage device. Although the digital still camera 10 generally employs JPEG data format as a lossy compression saving mode and TIFF data format as a lossless compression saving mode, other formats for saving the image data may also be used as well, including RAW data format, GIF data format, and BMP data format, for example.

The image data generated in the digital still camera 10 is transmitted to the color printer 30, for example, via a cable CV and the computer 20 or directly via a cable CV. The mage data may alternatively be transmitted to the color printer 30 by connecting the memory card MC, in which the image data is stored by the digital still camera 10, to the card slot 203 attached to the computer 20 or directly to the printer 30. The following describes a case where the personal computer 20 is used to execute the image processing on the image data and to output the processed image data to the color printer 30.

The color printer 30 is a printer that is capable of outputting a color image. For example, the color printer 30 is an inkjet printer that spouts four colors of inks i.e. cyan (C), magenta (M), yellow (Y), and black (K) onto a printing medium to form a dot pattern and thereby forms an image. The color printer 30 may alternatively be an electrophotographic printer that transfers and fixes color toner onto a printing medium and thereby forms an image. As for the color inks, light cyan (LC), light magenta (LM), and dark yellow (DY) may also be used in addition to the afore-mentioned four colors.

Figure 2:
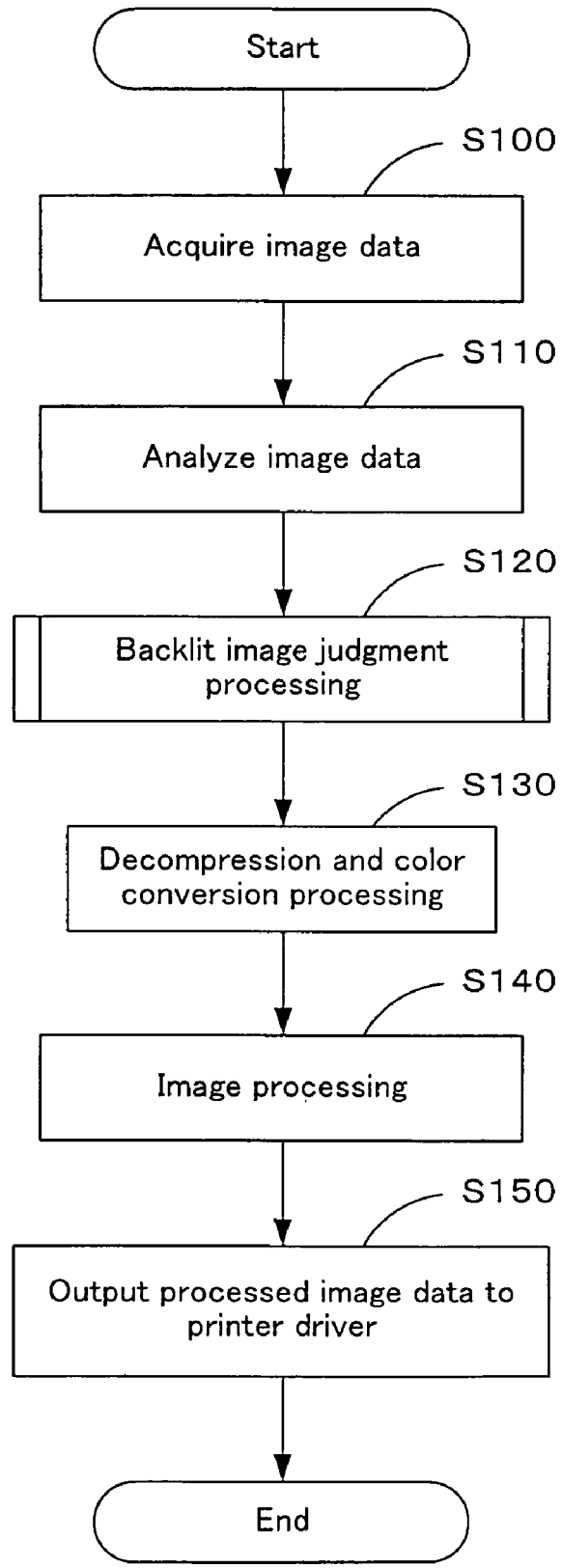
FIG. 2 is a flowchart that describes a processing routine of image processing to be executed in the personal computer in accordance with the present embodiment.
Figure 3:
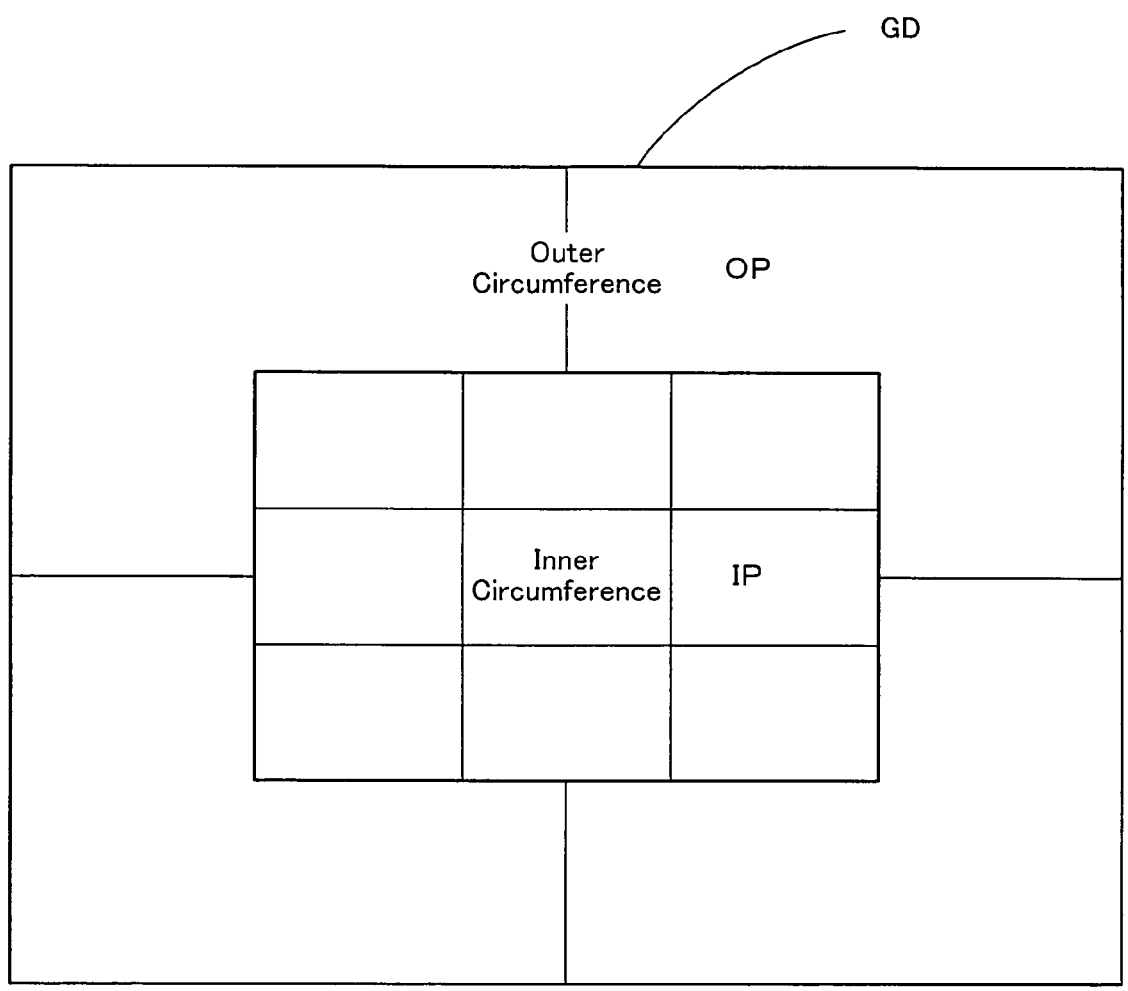
FIG. 3 is a schematic that shows an example of partitioning pixels into inner region pixels and outer region pixels in the course of analyzing the image data on a pixel-by-pixel basis.
Figure 4:
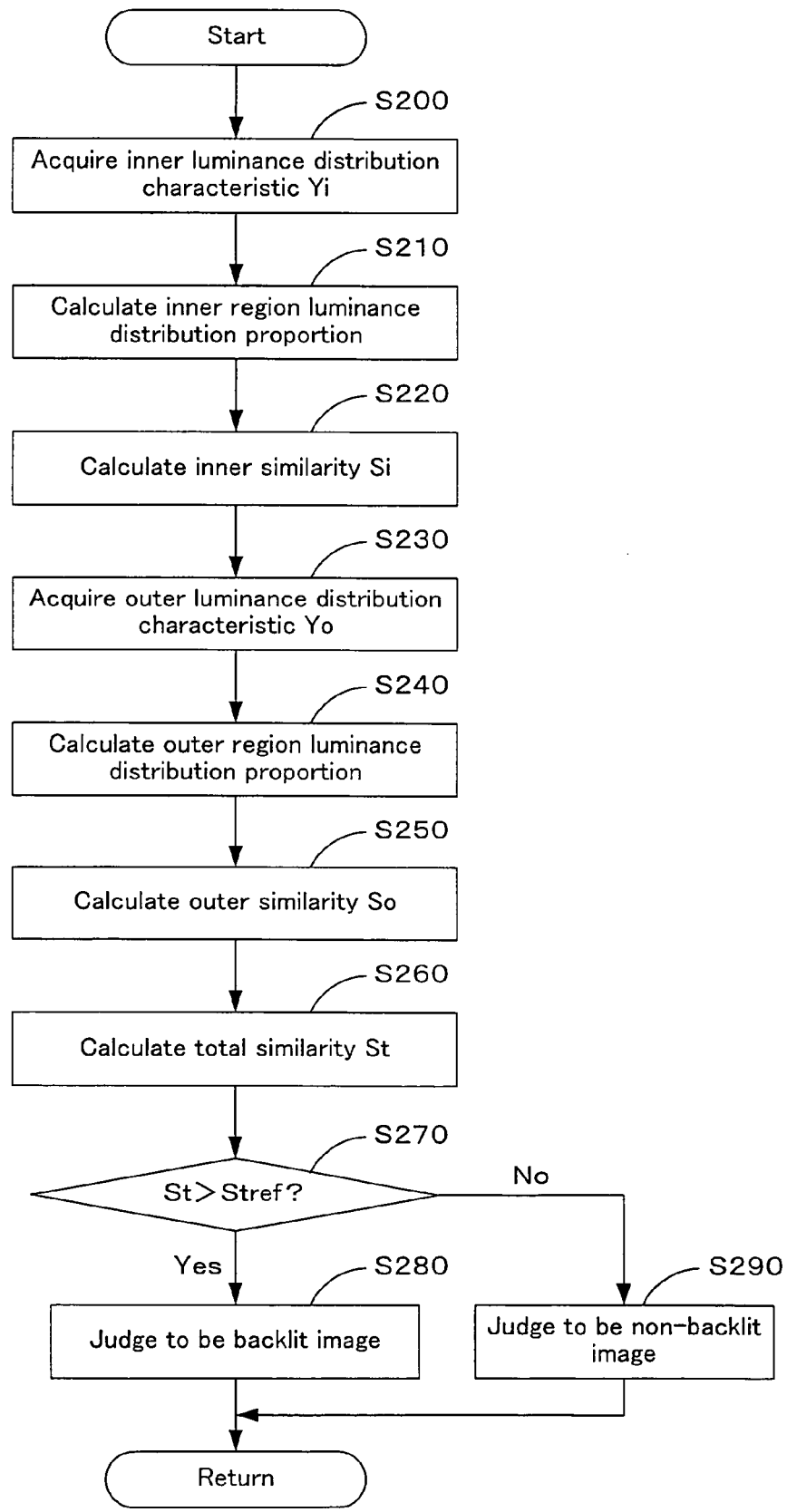
FIG. 4 is a flowchart that describes a processing routine of backlit image judgment processing of the present embodiment.
Figure 5:
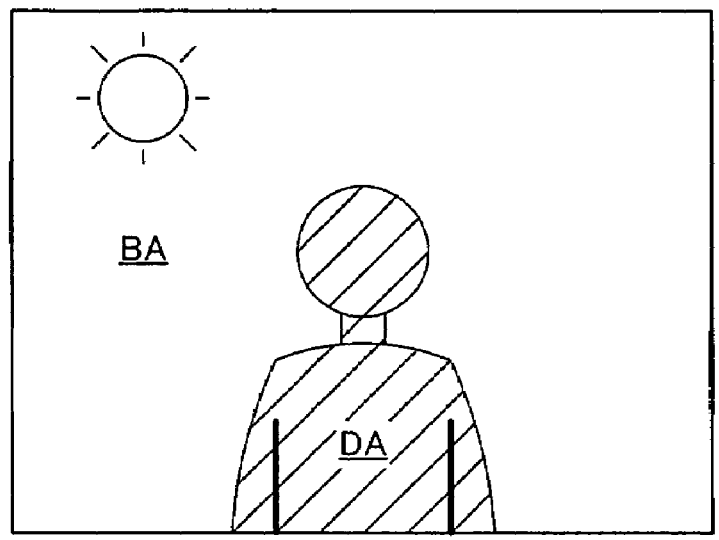
FIG. 5 is a conceptual schematic of image data of a backlit image developed on a memory.
Figure 6:
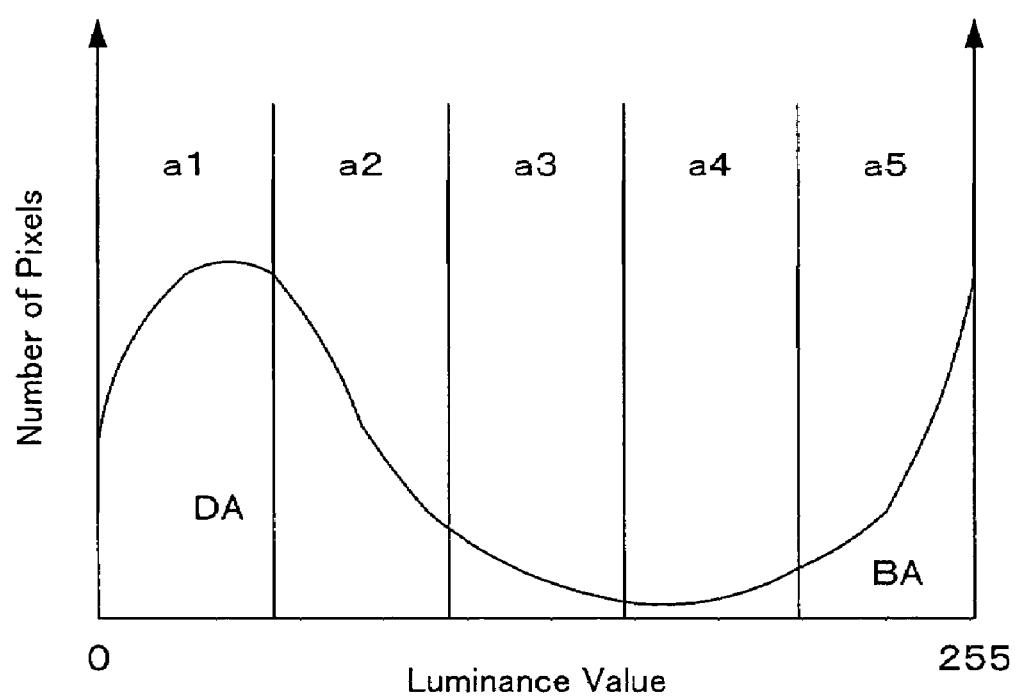
FIG. 6 is a schematic that shows a luminance distribution characteristic (histogram) regarding pixels of the entire image data, which is obtained by analyzing the image data shown in FIG. 5 on a pixel-by-pixel basis.
Figure 7:
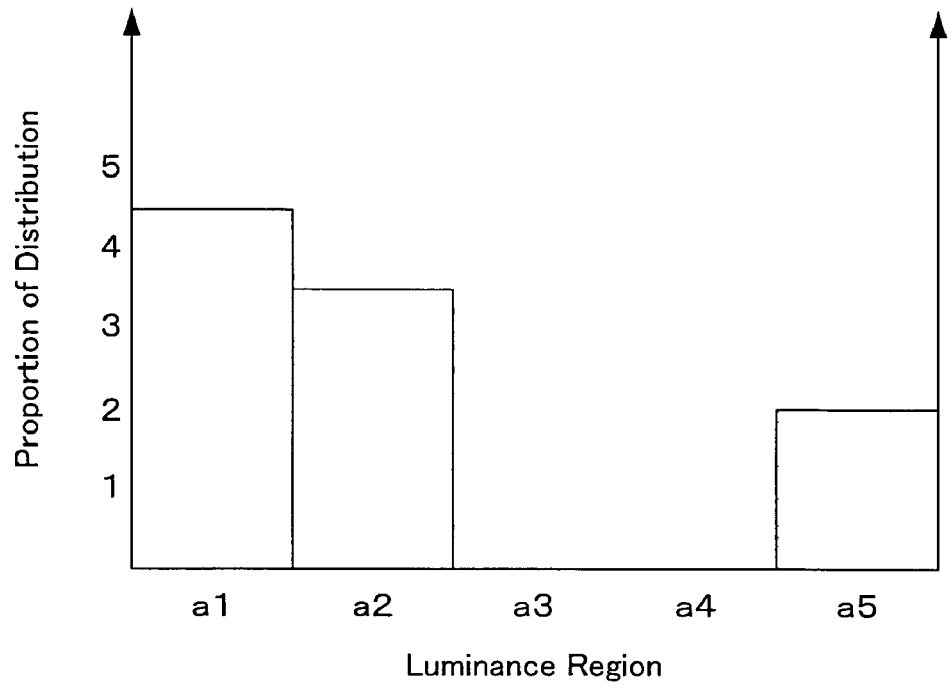
FIG. 7 is a schematic that shows luminance distribution proportions, which are obtained by partitioning the histogram shown in FIG. 6 into five equal portions.
Figure 8:
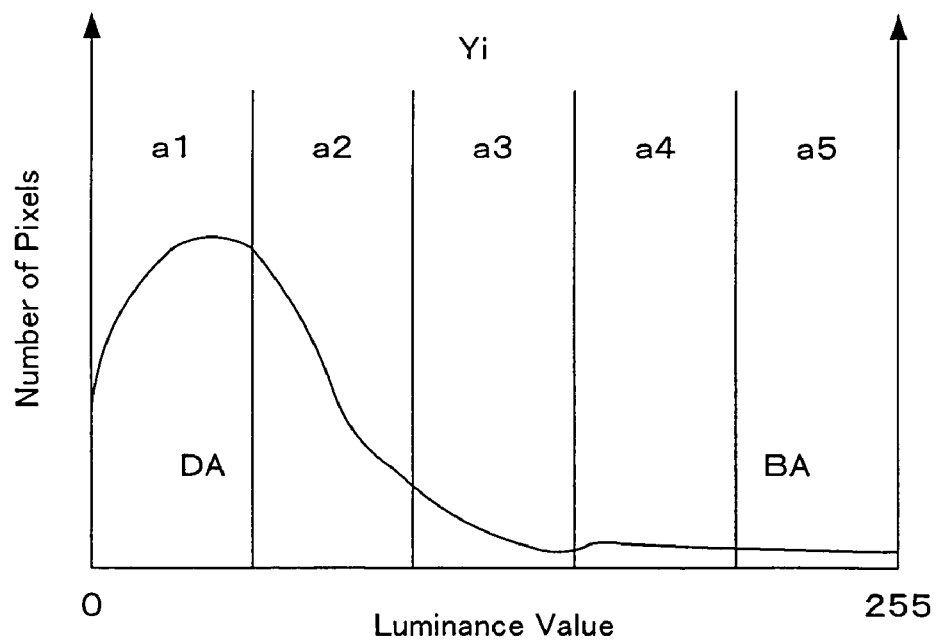
FIG. 8 is a schematic that shows a luminance distribution characteristic (histogram) regarding the inner region pixels of the image data, which is obtained by analyzing the image data shown in FIG. 5 on a pixel-by-pixel basis.
Figure 9:
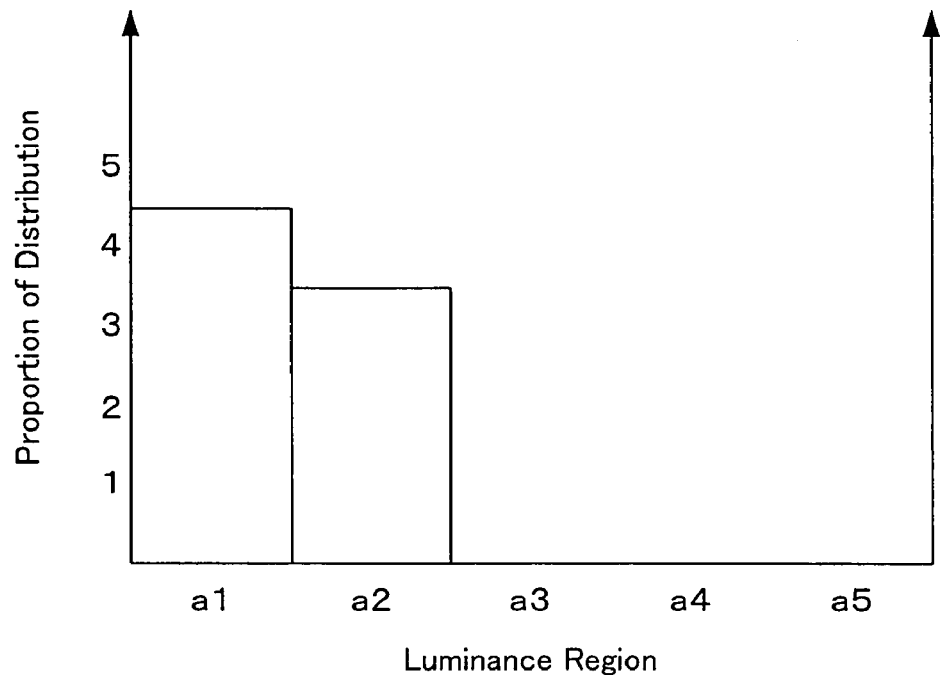
FIG. 9 is a schematic that shows luminance distribution proportions, which are obtained by partitioning the histogram shown in FIG. 8 into five equal portions.
Figure 10:
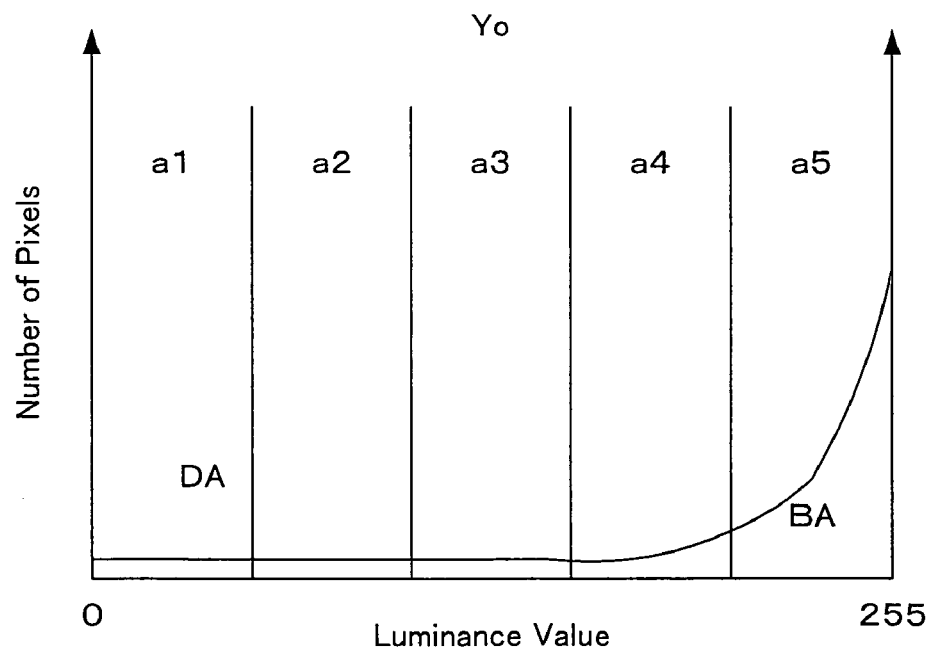
FIG. 10 is a schematic that shows a luminance distribution characteristic (histogram) regarding the outer region pixels of the image data, which is obtained by analyzing the image data shown in FIG. 5 on a pixel-by-pixel basis.
Figure 11:
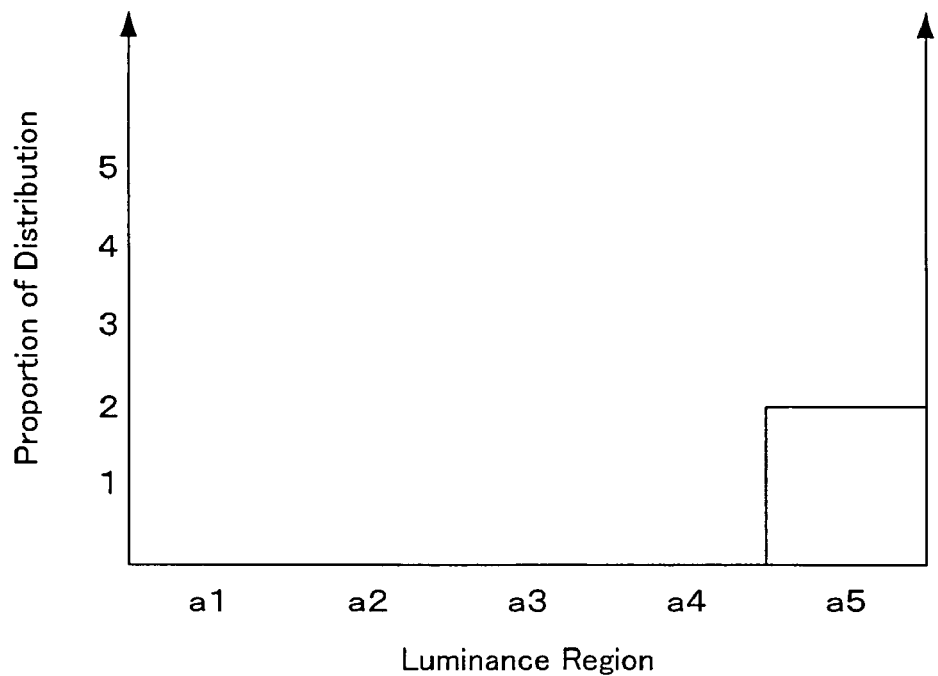
FIG. 11 is a schematic that shows luminance distribution proportions, which are obtained by partitioning the histogram shown in FIG. 10 into five equal portions.

B. Image Processing to be Executed in Personal Computer 20:

The image processing to be executed in the personal computer 20 will now be described with reference to FIGS. 2 to 7. FIG. 2 is a flowchart that describes a processing routine of image processing to be executed in a personal computer in accordance with the present embodiment. FIG. 3 is a schematic of an example of partitioning pixels into inner region pixels and outer region pixels in the course of analyzing the image data on a pixel-by-pixel basis. FIG. 4 is a flowchart that describes a processing routine of backlit image judgment processing. FIG. 5 is a conceptual schematic of image data of a backlit image developed on a memory. FIG. 6 is a schematic that shows a luminance distribution characteristic (histogram) regarding pixels of the entire image data, which is obtained by analyzing the image data shown in FIG. 5 on a pixel-by-pixel basis. FIG. 7 is a schematic that shows luminance distribution proportions that are obtained by partitioning the histogram shown in FIG. 6 into five equal portions. FIG. 8 is a schematic that shows a luminance distribution characteristic (histogram) regarding the inner region pixels of the image data, which is obtained by analyzing the image data shown in FIG. 5 on a pixel-by-pixel basis. FIG. 9 is a schematic of luminance distribution proportions that are obtained by partitioning the histogram shown in FIG. 8 into five equal portions. FIG. 10 is a schematic that shows a luminance distribution characteristic (histogram) regarding the outer region pixels of the image data, which is obtained by analyzing the image data shown in FIG. 5 on a pixel-by-pixel basis. FIG. 11 is a schematic of luminance distribution proportions that are obtained by partitioning the histogram shown in FIG. 10 into five equal portions.

When the memory card MC is inserted in the card slot 203 or when the connecting cable CV that connects to the digital still camera 10 is connected to the input/output terminal 204, the personal computer 20 (CPU 200) activates a program for image processing of the present embodiment. The CPU 200 then acquires (reads) image data from the memory card MC under user's instructions and temporarily stores the acquired image data into the RAM 201 (step S100).

The CPU 200 then analyzes the image data GD on a pixel-by-pixel basis (step S110). In the present embodiment, the image data GD (pixel data) is partitioned into inner region pixels IP corresponding to the central region of the shot image and outer region pixels OP corresponding to the non-central region of the shot image, as shown in FIG. 3. The inner region and the outer region are further partitioned into smaller portions, respectively. The problem of the backlit image generally arises when the image is shot for an object such as a person that is located closer to the camera than the background is. Since the object in such a case is typically located at the central region of the image, the backlit image judgment processing of the present embodiment is executed by considering pixels corresponding to the object image as the inner region pixels IP and pixels corresponding to the background image as the outer region pixels OP.

In the process of analyzing the image data GD on a pixel-by-pixel (data-by-data) basis, the CPU 200 executes individual analyses on the inner region pixels IP and the outer region pixels OP, and obtains luminance distribution characteristics thereof as image quality characteristics of the image data GD, respectively. The CPU 200 can extract luminance component directly from the image data, since the image data output from the digital still camera 10 generally is YCbCr data represented by luminance component and color-difference component. It should be noted herein that in the process of analyzing the image data GD, the CPU 200 may execute the analysis on the pixels constituting the entire image data, or may execute the analysis on a part of pixels constituting the entire image data.

In case where the image data GD corresponds to an image of a person shot under a backlight condition, as shown in FIG. 5, the pixels of the entire image data GD show a distribution characteristic of FIG. 6, the inner region pixels IP of the image data GD show a luminance distribution characteristic of FIG. 8, and the outer region pixels OP of the image data GD show a luminance distribution characteristic of FIG. 10, for example. Each of the graphs shown in FIGS. 6, 8, and 10 plots the luminance value of each pixel (values 0 to 255 in the present embodiment) as the abscissa and the number of pixels corresponding to each luminance value as the ordinate. FIG. 5 is a conceptual schematic of the image data GD that is developed on a memory, as mentioned previously.

When finished with the individual analyses on the inner region and the outer region of the image data GD, the CPU 200 executes the backlit image judgment processing that makes a judgment on whether the shot image corresponding to the image data GD is a backlit image (in step S120). The backlit image judgment processing is now described with reference to FIG. 4.

The CPU 200 acquires an inner luminance distribution characteristic Yi (FIG. 8) i.e. a luminance distribution characteristic of the inner region pixels IP that is obtained by analyzing the image data (S200). The CPU 200 then partitions the acquired inner luminance distribution characteristic Yi into five luminance regions a1, a2, a3, a4, and a5, and for each luminance region, divides the number of pixels belonging to the luminance region by the total number of pixels included in the entire image data GD and thereby obtains an inner region luminance distribution proportion (step S210). In the present embodiment, the inner region luminance distribution proportions corresponding to the inner luminance distribution characteristic Yi have a ratio of (a1:a2:a3:a4:a5)=(4.5:3.5:0:0:0), as shown in FIG. 9. It should be noted herein that the graph shown in FIG. 9 plots the luminance region as the abscissa and the proportion of distribution of each luminance region as the ordinate.

The CPU 200 compares the acquired inner region luminance distribution proportions with reference inner region luminance distribution proportions, which are based on a reference luminance distribution characteristic of inner region pixels IP of image data of a backlit image previously stored in the HDD 202, and thereby calculates an inner similarity Si (step S220).

Figure 12:
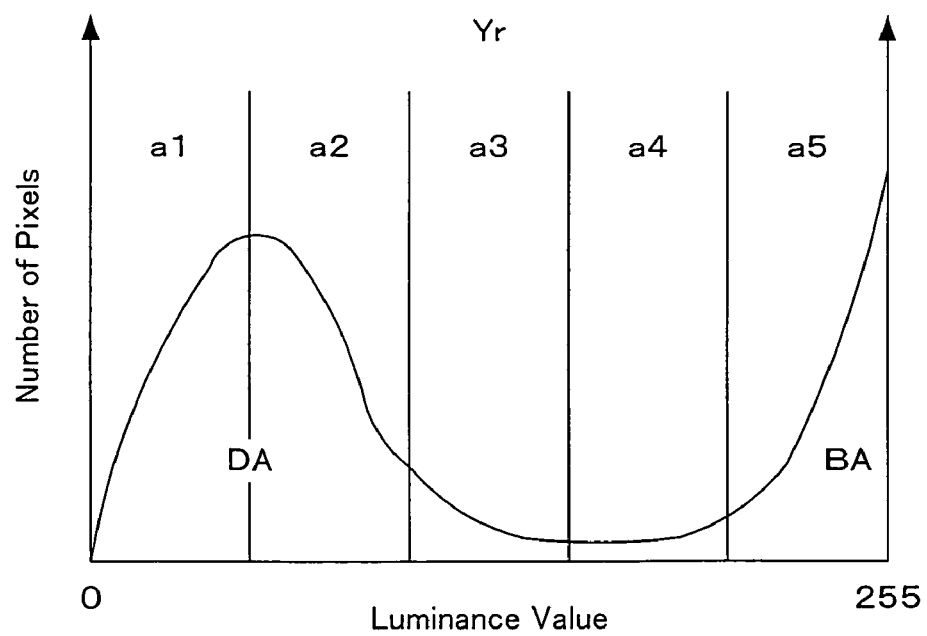
FIG. 12 is a schematic that shows a luminance distribution characteristic (histogram) regarding pixels of the entire image data of a reference backlit image that is used for the backlit image judgment.
Figure 13:
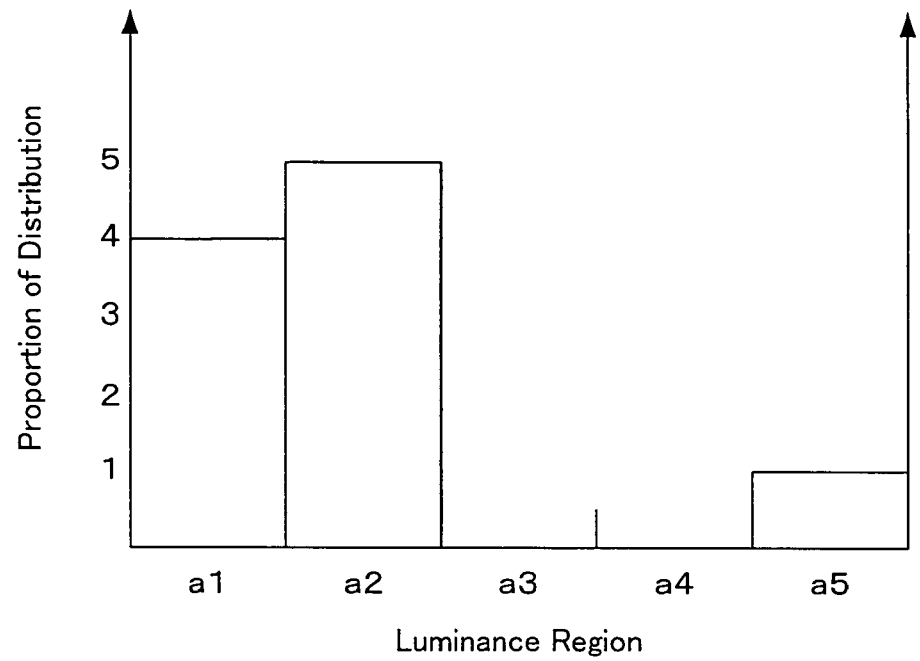
FIG. 13 is a schematic that shows reference luminance distribution proportions, whish are obtained by partitioning the histogram shown in FIG. 12 into five equal portions.
Figure 14:
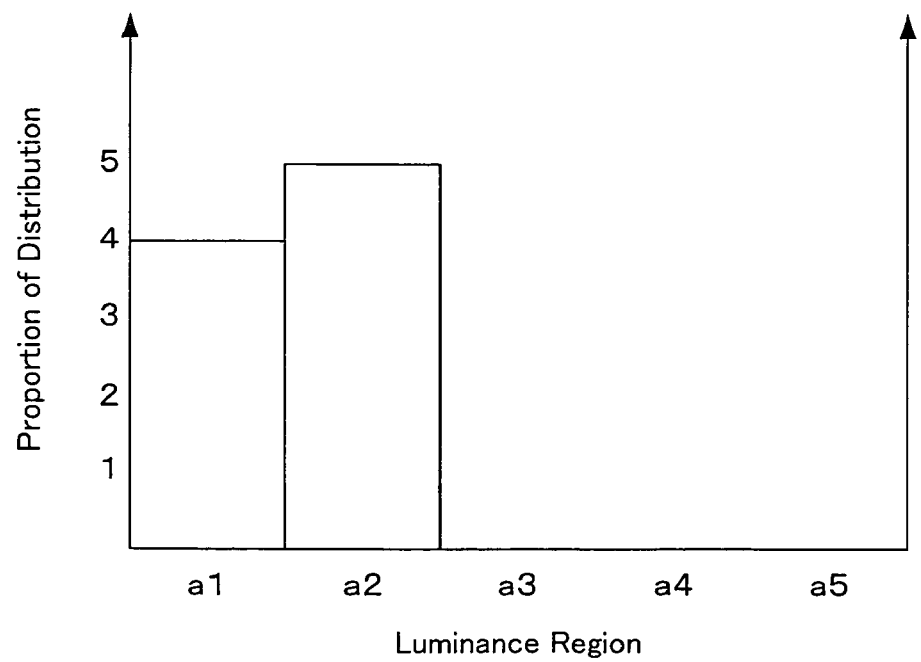
FIG. 14 is a schematic that shows reference inner region luminance distribution proportions regarding inner region pixels of the image data of the reference backlit image.
Figure 15:
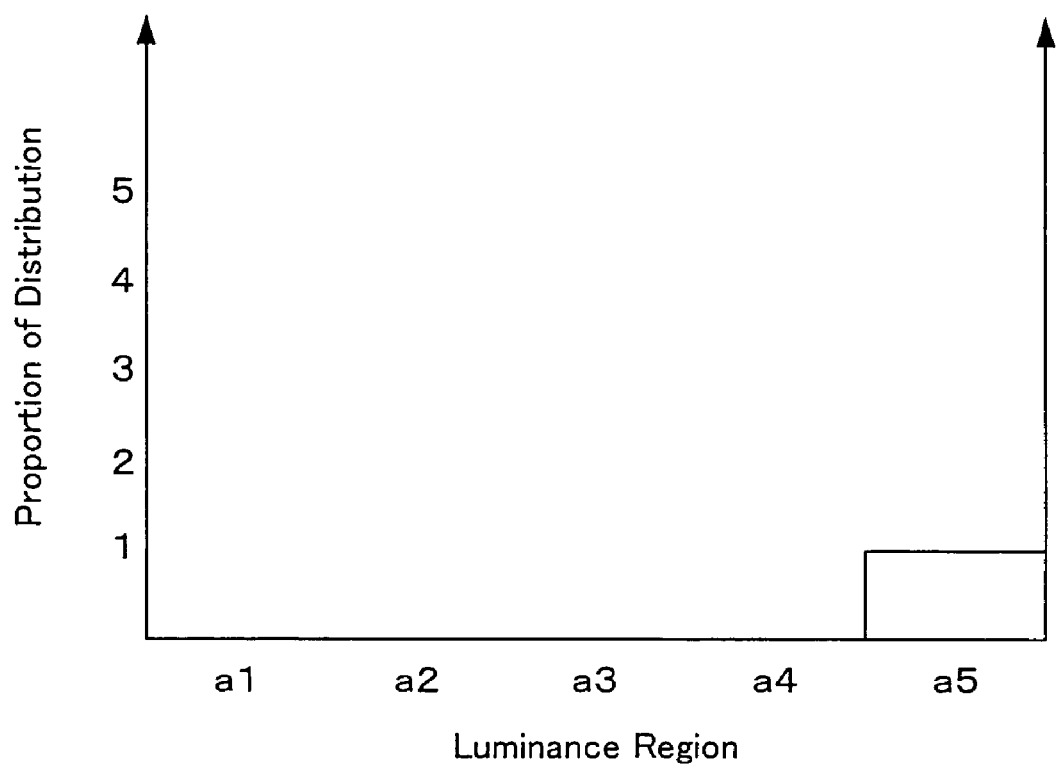
FIG. 15 is a schematic that shows reference outer region luminance distribution proportions regarding outer region pixels of the image data of the reference backlit image.

The following describes luminance distribution characteristic Yr, luminance distribution proportions, luminance distribution proportions regarding the inner region pixels, and luminance distribution proportions regarding the outer region pixels, of the shot image in case where the image is a backlit image, with reference to FIGS. 12 to 15. FIG. 12 is a schematic that shows a luminance distribution characteristic (histogram) regarding pixels of the entire image data of a reference backlit image that is used for the backlit image judgment. FIG. 13 is a schematic that shows reference luminance distribution proportions that are obtained by partitioning the histogram shown in FIG. 12 into five equal portions. FIG. 14 is a schematic that shows reference inner region luminance distribution proportions regarding inner region pixels of the image data of the reference backlit image. FIG. 15 is a schematic that shows reference outer region luminance distribution proportions regarding the outer region pixels of the image data of the reference backlit image.

The backlit image data can be roughly grouped into a bright background region BA and a dark object (person) region DA, as shown in FIG. 5. A typical (ideal) backlit image (image data), accordingly, has a luminance value distribution with two peaks i.e. one at the lower luminance area (darker area) and the other at the higher luminance area (brighter area). Since the backlit image has extremely high luminance at the higher luminance area, the histogram on the higher luminance side shows a spike-like peak included within one luminance region. Furthermore, the reference luminance distribution proportions have a ratio of (a1:a2:a3:a4:a5)=(4:5:0:0 1), as shown in FIG. 13; the reference inner region luminance distribution proportions have a ratio of (a1:a2:a3:a4:a5)=(4:5:0:0:0), as shown in FIG. 14; and the reference outer region luminance distribution proportions have a ratio of (a1:a2:a3:a4:a5)=(0:0:0:0:1), as shown in FIG. 15.

The calculation of the inner similarity Si will now be described in detail. The inner similarity Si is calculated by the following equation (1), as a cosine (cos) of a five dimension vector having values of the respective distribution proportions as its components.

$$\text{Inner Similarity } Si = \cos\theta = \frac{\vec{g}_o \cdot \vec{g}_n}{|\vec{g}_o||\vec{g}_n|} \quad (1)$$

The vector $g_o$ is a vector having the reference inner region luminance distribution proportions as its components, and has the component values of (4, 5, 0, 0, 0). The vector $g_n$, on the other hand, is a vector having the inner region luminance distribution proportions i.e. the luminance distribution proportions for the inner region pixels IP of the target image data as its components, and has the component values of (4.5, 3.5, 0, 0, 0), for example. The right-hand side of the equation (1) is a division of an inner product of the two vectors $g_o$, $g_n$ by a product of magnitudes of the two vectors $g_o$, $g_n$. The right-hand side of the equation (1) is thus equal to a cos component of the two vectors $g_o$, $g_n$.

The cos component of the two vectors $g_o$, $g_n$ has a maximum value of 1 when the two vectors coincide with one another, and decreases as an angle between the two vectors increases. Whether the two vectors are similar to one another i.e. the degree of similarity between the two vectors can be judged on the basis of whether the value obtained by the equation (1) is close to the value of 1.

When finished with the calculation of the inner similarity Si, the CPU 200 acquires an outer luminance distribution characteristic Yo (FIG. 10) i.e. a luminance distribution characteristic of the outer region pixels OP that is obtained by analyzing the image data (step S230). The CPU 200 then partitions the acquired outer luminance distribution characteristic Yo into five luminance regions a1, a2, a3, a4, and a5, and for each luminance region, divides the number of pixels belonging to the luminance region by the total number of pixels included in the entire image data GD and thereby obtains an outer region luminance distribution proportion (step S240). In the present embodiment, the luminance distribution proportions of the inner region corresponding to the inner luminance distribution characteristic Yo show a ratio of (a1:a2:a3:a4:a5)=(0:0:0:0:2), as shown in FIG. 11. It should be noted herein that the graph shown in FIG. 11 plots the luminance region as the abscissa and the proportion of distribution of each luminance region as the ordinate.

The CPU 200 then compares the acquired outer region luminance distribution proportions with reference outer region luminance distribution proportions, which are based on a reference luminance distribution characteristic of outer region pixels OP of the image data of the backlit image previously stored in the HDD 202, and thereby calculates an outer similarity So (step S250).

The outer similarity So is calculated by the following equation (2) in a way similar to the previously described method for the inner similarity Si.

$$\text{Outer Similarity } So = \cos\theta = \frac{\vec{g}_o \cdot \vec{g}_n}{|\vec{g}_o||\vec{g}_n|} \quad (2)$$

In the calculation of the outer similarity So, the vector $g_o$ of the equation (2) has the reference outer region luminance distribution proportions as its components and has the component values of (0, 0, 0, 0, 1); and the vector $g_n$ of the equation (2) has the outer region luminance distribution proportions i.e. the distribution proportions for the outer region pixels OP of the target image data and has the component values of (0, 0, 0, 0, 2), for example.

The CPU 200 multiplies the calculated inner similarity Si by the calculated outer similarity So to obtain a total similarity St (step 260).

$$St=Si*So \quad \text{Equation (3)}$$

The CPU compares the calculated total similarity St with a criterion similarity Stref to judge whether the total similarity St is greater than the criterion similarity Stref (step 270), and if the total similarity St is judged to be greater than the criterion similarity Stref (Yes returned in step S270), the CPU 200 judges that the shot image corresponding to the target image data is a backlit image (step S280), and ends the present processing routine and returns to the processing routine shown in FIG. 2.

If the total similarity St is judged to be equal or less than the criterion similarity Stref (No returned in step S270), the CPU 200 judges that the shot image corresponding to the target image data is a non-backlit image (step S290), and ends the present processing routine and returns to the processing routine shown in FIG. 2.

Referring back to FIG. 2, the CPU 200 executes data decompression and color conversion processing (step S130). Specifically, the CPU 200 decompresses the image data GD and then uses a matrix S to execute a matrix operation over the decompressed image data GD to attain color conversion processing from YCbCr to RGB.

The image data used in the present embodiment stores JPEG image data i.e. compressed YCbCr data therein. On the other hand, RGB data is generally used in the image processing executed in current personal computers PC and printers. It is thus required to execute the decompression (decoding) of JPEG data and the color conversion processing from YCbCr data to RGB data. The matrix S is a generally used matrix in the conversion from YCbCr data to RGB data in the JFIF standard and is well-known to persons skilled in the art. Details of the matrix is thus not described herein.

If the image data GD is judged to be the image data of a backlit image, the CPU 200 executes image processing suitable for a backlit image; whereas if the image data is judged to be the image data of a non-backlit image, the CPU executes normal image processing (step S140). Suitable correction for the image data of a backlit image includes a correction that increases brightness (luminance) of lower luminance components of the image data through the use of a tone curve of input/output values.

The CPU 200 then outputs the image data that has undergone the image processing to a printer driver (step S150) and ends the present processing routine. The printer driver executes color conversion processing from the image data (RGB data) to CMYK data. In other words, the color system of the image data is converted into CMYK color system i.e. a color system that is used by the color printer 20 in the execution of print processing. Specifically, a look up table stored in the DD 202 (ROM), which defines the correspondence between the RGB color system and the CMYK color system, is used to execute the color conversion processing. The image data also goes through halftone processing and resolution conversion processing, and is finally output to the color printer 30 in a format of raster data for printing.

According to the above-described image processing device and method for backlit image judgment of the present embodiment, whether the target image is a backlit image is judged on the basis of the similarity between the reference luminance distribution characteristic (reference luminance distribution proportions) of the reference backlit image and the luminance distribution characteristic (luminance distribution proportions) of the target image. This eliminates the need to calculate a maximum luminance value and an average luminance value for every constituent pixel of the image data, and thus allows for more stable backlit image judgment that brings the image close to the impression of the entire image, and at the same time, also improves the processing speed of the backlit image judgment.

In the course of the backlit image judgment that uses the similarity of the luminance distribution characteristic of the image data against the luminance distribution characteristic of the backlit image data, the pixels constituting the image data are grouped into the inner region pixels IP and the outer region pixels OP, followed by the individual calculation of the inner similarity Si for the inner region pixels IP and the outer similarity So for the outer region pixels OP, and finally the product of the similarities Si, So is used to judge whether the shot image is a backlit image. This allows the judgment to be made on whether the inner region pixels IP correspond to image data of the object region of a backlit image and whether the outer region pixels OP correspond to image data of the background region of the backlit image.

As can be seen from the above description, there is no possibility of misjudging the target image data as image data of an image of a nightscape and a person, which may possibly have a similar luminance distribution characteristic of pixels constituting the entire image data as that of a backlit image. This prevents misjudgment in the similarity judgment processing that uses the luminance distribution characteristic of the image data, and allows a more appropriate and high precision judgment to be made on whether the target image data (shot image) is that of a backlit image based on the result of analysis on the image data.

The object in the present embodiment may be any major object in the foreground. Examples of such a suitable major object include a person, a pet animal such as a dog or a cat, an object such as a vehicle, and the like. Shooting an image of such an object under a backlight condition generally results in the object having a lower luminance than that of the background. This gives rise to a problem that details of the object cannot be represented with clarity.

OTHER EMBODIMENTS

Although the luminance region is partitioned into five equal regions and the five-dimensional vector is used to make the similarity judgment in the above described embodiments, the similarity judgment may alternatively be made by using other multi-dimensional vectors. Examples of such alternative multi-dimensional vectors include a three-dimensional vector based on three equal regions, ten-dimensional vector based on ten equal regions, and the like. The number of the partitioned regions may be determined based on the precision and the processing speed required for the backlit image.

Although the judgment on whether the shot image is a backlit image is made by using the luminance distribution characteristic of the image data as a parameter for indicating an image quality characteristic of the image data in the above-described embodiment, other parameters may alternatively be used for indicating an image quality characteristic of the image data. Examples of such alternative parameters include contrast, highlight, shadow, and the like, all of which relating to the image brightness.

Although the personal computer 20 is used as the image processing device to execute the image processing in the above-described embodiment, other devices may alternatively be used as the image processing device. Examples of such alternative devices include a stand-alone type printer having the function of image processing, in which case the image processing is executed by the printer. Alternatively, the image processing may also be attained by a printer driver or an image processing application (program) without accompanying any hardware configuration including the image processing device.

It goes without saying that the image processing executed by the personal computer 20 may include various adjustments such as contrast adjustment and color adjustment in addition to the brightness adjustment. In such a case, the CPU 200 analyzes the image data on a pixel-by-pixel basis and thereby acquires various characteristic parameter values, for example, image statistics such as a minimum luminance, a maximum luminance, and a brightness representative value. The CPU 200 determines an amount of correction for each of the parameters in a way to eliminate or reduce the difference between reference values that are previously defined for each of the characteristic parameters and are stored in the HDD 202 and the image statistics that are acquired by the analysis, and thereby corrects RGB values of the image data. The correction of the image data is then executed by applying the determined amounts of correction to a tone curve, which defines the relationship of output values to input values, and then by using the corrected tone curve to modify the RGB values of each pixel included in the image data.

In the above-described embodiment, the luminance distribution characteristic is obtained by using the YCbCr data from the digital still camera 10 without any change. The luminance distribution characteristic, however, may alternatively be obtained by executing a conversion from YCbCr to RGB at first and then by calculating a luminance value Y from the RGB values.

In the above-described embodiment, the object region often corresponds to the central region of the image and the background region often corresponds to the non-central region of the image. The object region, however, does not necessarily correspond to the central region of the image. That is to say, the object region may include both the central region and the region in which the foreground object exists.

Although the image processing device, the method for backlit image judgment, and the program for backlit image judgment of the present invention have been described above in terms of embodiments, these embodiments are only purposed to facilitate understanding of the present invention and are not considered to limit the present invention. There may be various changes and modifications without departing from the scope or spirit of the claims of the present invention, as well as various equivalents included within the scope of the invention. Finally, the present application claims the priority based on Japanese Patent Application No. 2003-203431 filed on Jul. 30, 2003, which is herein incorporated by reference.

What is claimed is:

1. An image processing device that makes a judgment on whether a shot image is a backlit image, based on image data that is comprised of plural pixels, the device comprising:
   an acquiring module that acquires the image data;
   an analysis module that partitions the plural pixels constituting the acquired image data into inner region pixels corresponding to the central region of the shot image and outer region pixels corresponding to the non-central region of the shot image, and thereby analyzes the respective groups of pixels;
   an inner luminance distribution characteristic acquiring module that acquires an inner luminance distribution characteristic by using the result of the analysis, the inner luminance distribution characteristic being a luminance distribution characteristic regarding the inner region pixels;
   an outer luminance distribution characteristic acquiring module that acquires an outer luminance distribution characteristic by using the result of the analysis, the outer luminance distribution characteristic being a luminance distribution characteristic regarding the outer region pixels;
   an inner similarity calculation module that calculates an inner similarity by using the acquired inner luminance distribution characteristic, the inner similarity indicating a degree of similarity between the central region of a backlit image and the central region of the shot image;
   an outer similarity calculation module that calculates an outer similarity by using the acquired outer luminance distribution characteristic, the outer similarity indicating a degree of similarity between the non-central region of the backlit image and the non-central region of the shot image; and
   a judgment module that makes a judgment on whether the shot image is a backlit image by using the calculated inner similarity and outer similarity.

2. An image processing device that makes a judgment on whether a shot image is a backlit image, based on image data that is comprised of plural pixels, the device comprising:
   an acquiring module that acquires the image data;
   an analysis module that partitions the plural pixels constituting the acquired image data into object region pixels corresponding to the object region of the shot image and background region pixels corresponding to the background region or the non-object region of the shot image, and thereby analyzes the respective groups of pixels;
   an object luminance distribution characteristic acquiring module that acquires an object luminance distribution characteristic by using the result of analysis, the object luminance distribution characteristic being a luminance distribution characteristic regarding the object region pixels;
   a background luminance distribution characteristic acquiring module that acquires a background luminance distribution characteristic by using the result of analysis, the background luminance distribution characteristic being a luminance distribution characteristic regarding the background region pixels;
   an object similarity calculation module that calculates an object similarity by using the acquired object luminance distribution characteristic, the object similarity indicating a degree of similarity between the object region of a backlit image and the object region of the shot image;
   a background similarity calculation module that calculates a background similarity by using the acquired background luminance distribution characteristic, the background similarity indicating a degree of similarity between the background region of the backlit image and the background region of the shot image; and a judgment module that makes a judgment on whether the shot image is a backlit image by using the calculated object similarity and background similarity.

3. An image processing device that makes a judgment on whether a shot image is a backlit image, based on image data that is comprised of plural pixels, the device comprising:

an image data acquiring module that acquires the image data;

a pixel region partitioning module that partitions the plural pixels constituting the acquired image data into inner region pixels corresponding to the central region of the shot image and outer region pixels corresponding to the non-central region of the shot image;

an inner image quality characteristic acquiring module that analyzes the inner region pixels and thereby acquires an inner image quality characteristic indicating an image quality characteristic;

an outer image quality characteristic acquiring module that analyzes the outer region pixels and thereby acquires an outer image quality characteristic indicating an image quality characteristic;

an inner similarity calculation module that calculates an inner similarity by using the acquired inner image quality characteristic, the inner similarity indicating a degree of similarity between features in the central region of a lo backlit image and features in the central region of the shot image;

an outer similarity calculation module calculates an outer similarity by using the acquired outer image quality characteristic, the outer similarity indicating a degree of similarity between features in the non-central region of the backlit image and features in the non-central region of the shot image; and a judgment module that makes a judgment on whether the shot image is a backlit image by using the calculated inner similarity and outer similarity.

* * * * *